(12) United States Patent
Yamamoto

(10) Patent No.: US 8,500,875 B2
(45) Date of Patent: Aug. 6, 2013

(54) DESULFURIZER

(75) Inventor: Jun Yamamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 149 days.

(21) Appl. No.: 13/062,893

(22) PCT Filed: Aug. 12, 2009

(86) PCT No.: PCT/JP2009/064476
§ 371 (c)(1),
(2), (4) Date: Mar. 8, 2011

(87) PCT Pub. No.: WO2010/026875
PCT Pub. Date: Mar. 11, 2010

(65) Prior Publication Data
US 2011/0165477 A1    Jul. 7, 2011

(30) Foreign Application Priority Data
Sep. 8, 2008  (JP) ................. 2008-229678

(51) Int. Cl.
*B01D 53/02*  (2006.01)
(52) U.S. Cl.
USPC ............. 96/108; 95/135; 95/136; 95/137; 422/187; 429/410
(58) Field of Classification Search
USPC ......... 429/410; 422/187; 95/135–137; 96/108
See application file for complete search history.

(56) References Cited

U.S. PATENT DOCUMENTS

| | | | | |
|---|---|---|---|---|
| 2,472,254 A | * | 6/1949 | Johnson | 585/257 |
| 2,835,560 A | * | 5/1958 | Bason et al. | 422/637 |
| 3,449,099 A | * | 6/1969 | Berk et al. | 48/214 A |
| 3,898,049 A | * | 8/1975 | Burroughs et al. | 422/616 |
| 4,273,750 A | * | 6/1981 | Hollett et al. | 423/244.01 |
| 4,609,539 A | * | 9/1986 | Horecky et al. | 423/244.09 |
| 4,705,621 A | * | 11/1987 | Penick | 208/146 |
| 5,019,137 A | * | 5/1991 | Ruottu | 95/108 |
| 7,462,224 B2 | * | 12/2008 | Wolff | 96/132 |
| 7,674,445 B2 | * | 3/2010 | Taguchi et al. | 423/247 |

(Continued)

FOREIGN PATENT DOCUMENTS

| | | |
|---|---|---|
| JP | 6-263401 | 9/1994 |
| JP | 2001-106507 | 4/2001 |

(Continued)

OTHER PUBLICATIONS

Information Disclosure Statement for Application No. PCT/JP2009/064476, dated Feb. 23, 2010.

(Continued)

*Primary Examiner* — Christopher P Jones
(74) *Attorney, Agent, or Firm* — Nelson Mullins Riley & Scarborough LLP; Anthony A. Laurentano

(57) ABSTRACT

A desulfurizer includes a filled chamber having a raw fuel passage through which a raw fuel flows, the filled chamber being filled with a desulfurizing agent, a supply chamber disposed upstream of the filled chamber, for uniformly supplying the raw fuel to the raw fuel passage, and a discharge chamber disposed downstream of the filled chamber, for uniformly discharging the raw fuel from the raw fuel passage. The raw fuel passage has first and second reversers for reversing the direction in which the raw fuel flows. The raw fuel passage has a cross-sectional area which is smaller in a downstream portion thereof than in an upstream portion thereof.

11 Claims, 17 Drawing Sheets

U.S. PATENT DOCUMENTS 7,998,258 B2 * 8/2011 Goto et al. .................. 96/134
2002/0048540 A1 * 4/2002 Okazaki et al. ............. 422/187

FOREIGN PATENT DOCUMENTS

| JP | 2005-255896 | 9/2005 |
| JP | 2006-273635 | 10/2006 |
| JP | 2008-117652 | 5/2008 |

OTHER PUBLICATIONS

Japanese Office Action for Application No. 2008-229688, 5 pages, dated Nov. 27, 2012.
Japanese Office Action for Application No. 2008-229678, 4 pages, dated Jan. 8, 2013.

* cited by examiner

DESULFURIZER

RELATED APPLICATIONS

This application is a 35 U.S.C. 371 national stage filing of International Application No. PCT/JP2009/064476, filed Aug. 12, 2009, which claims priority to Japanese Patent Application No. 2008-229678 filed on Sep. 8, 2008 in Japan. The contents of the aforementioned applications are hereby incorporated by reference.

TECHNICAL FIELD

The present invention relates to a desulfurizer for removing sulfur component from a raw fuel.

BACKGROUND ART

Typically, a solid oxide fuel cell (SOFC) employs a solid electrolyte comprising ion-conductive solid oxide such as stabilized zirconia, for example. The electrolyte is interposed between an anode and a cathode to form an electrolyte electrode assembly. The electrolyte electrode assembly is interposed between separators (bipolar plates). In use, normally, predetermined numbers of the electrolyte electrode assemblies and the separators are stacked together to form a fuel cell stack.

As the fuel gas supplied to the fuel cell, normally, a hydrogen gas generated from hydrocarbon raw material by a reformer is used. In general, in the reformer, a reformed raw material gas is obtained from hydrocarbon raw material of a fossil fuel or the like, such as methane or LNG, and the reformed raw material gas undergoes steam reforming, partial oxidation reforming, or autothermal reforming to produce a reformed gas (fuel gas). For this reason, before the raw material is reformed, sulfur component needs to be removed from the raw material by a desulfurizer.

For example, as shown in FIG. 16 of the accompanying drawings, a desulfurizer for use with a fuel cell disclosed in Japanese Laid-Open Patent Publication No. 2008-117652 comprises a hollow cylindrical vessel 1a having a gas flow passage SP through which a fuel gas flows, partition plates 2a disposed as wall members and partition members in the gas flow passage SP, and a desulfurizing agent 3a which fills the gas flow passage SP.

Since the gas flow passage SP is segmented into a plurality of passageways by the partition plates 2a, the fuel gas which flows in the gas flow passage SP is also divided into a plurality of fuel gas streams and hence, uneven flow distribution of the fuel gas is prevented in the gas flow passage SP.

Although not a desulfurizer, Japanese Laid-Open Patent Publication No. 2006-273635 discloses a reformer, which is similar in construction to the desulfurizer. As shown in FIG. 17 of the accompanying drawings, the disclosed reformer has a lower plate 1b and an upper plate 2b. The lower plate 1b supports thereon a plurality of upwardly extending partition plates 3b, and the upper plate 2b supports thereon a plurality of downwardly extending partitions 4b, thereby defining a fluid passage 7b that is serpentine up and down and extends from a fuel inlet 5b to a fuel outlet 6b.

However, the desulfurizer disclosed in Japanese Laid-Open Patent Publication No. 2008-117652 fails to meet minimum flow velocity requirements and is unable to prevent uneven flow distribution of the fuel gas, in a wide operating range from a partial load operation mode to a rated operation mode. In addition, the disclosed desulfurizer cannot absorb pulsation flows of raw fuel and hence cannot supply a desulfurized raw fuel stably. Further, if the gas flow passage SP is increased in length for a better desulfurizing capability, then the desulfurizer itself is increased in size (length) and cannot be made compact.

If the reformer disclosed in Japanese Laid-Open Patent Publication No. 2006-273635 is used as a desulfurizer, then it also finds it difficult to meet minimum flow velocity requirements and tends to fail to prevent uneven flow distribution of the fuel gas, in a wide operating range. In addition, the disclosed reformer cannot absorb pulsation flows of raw fuel and hence cannot supply a desulfurized raw fuel stably.

SUMMARY OF INVENTION

It is an object of the present invention to provide a desulfurizer which is simple in structure and small in size, is capable of maintaining a desired desulfurizing efficiency and desulfurizing capability in a wide operating range, is highly durable, and is capable of supplying a desulfurized raw fuel stably.

The present invention is concerned with a desulfurizer for removing sulfur component from a raw fuel. The desulfurizer includes a filled chamber having a raw fuel passage through which the raw fuel flows, and the filled chamber being filled with a desulfurizing agent, a supply chamber disposed upstream of the filled chamber, for uniformly supplying the raw fuel to the raw fuel passage, and a discharge chamber disposed downstream of the filled chamber, for uniformly discharging the raw fuel from the raw fuel passage. The raw fuel passage has at least one reverser for reversing the direction in which the raw fuel flows. The raw fuel passage has a cross-sectional area which is smaller in a downstream portion thereof than in an upstream portion thereof.

With the above arrangement of the present invention, since the raw fuel that is supplied to the desulfurizer is temporarily stored in the supply chamber, the raw fuel is supplied uniformly to the entire area of the raw fuel passage. The desulfurized raw fuel flows from the filled chamber and is temporarily stored in the discharge chamber. Therefore, the desulfurized raw fuel is discharged uniformly from the entire area of the raw fuel passage. Consequently, the entire area of the desulfurizing agent can effectively be utilized, resulting in an improved desulfurizing efficiency.

Further, the raw fuel passage has the reversers for reversing the direction in which the raw fuel flows. Therefore, the overall length of the desulfurizer is reduced, whereas the raw fuel passage is effectively elongated. Since the raw fuel and the desulfurizing agent are held in contact with each other over a long period of time, the desulfurizer has a high desulfurizing capability.

Furthermore, the cross-sectional area of the raw fuel passage is smaller in its downstream portion than in its upstream portion. Thus, in a partial load operation mode, the raw fuel flows through the region of the raw fuel passage which has a smaller cross-sectional area at a minimum flow velocity. In a rated operation mode, the raw fuel flows through the entire raw fuel passage at a minimum flow velocity. Accordingly, in a wide operating range, the raw fuel passage is effective to prevent the raw fuel from unevenly flowing, and is also effective to utilize the desulfurizing agent in its entirety over a long period of time. The desulfurizer is therefore highly durable and can be serviced for maintenance at increased time intervals.

The desulfurizer can have a function as a pressure regulation chamber (buffer tank). Therefore, the desulfurizer can absorb raw fuel pulsation flows and can supply a desulfurized raw fuel stably, thereby allowing a fuel cell combined therewith to operate stably.

The above and other objects, features, and advantages of the present invention will become more apparent from the following description when taken in conjunction with the accompanying drawings in which preferred embodiments of the present invention are shown by way of illustrative example.

DESCRIPTION OF EMBODIMENTS

Figure 1:
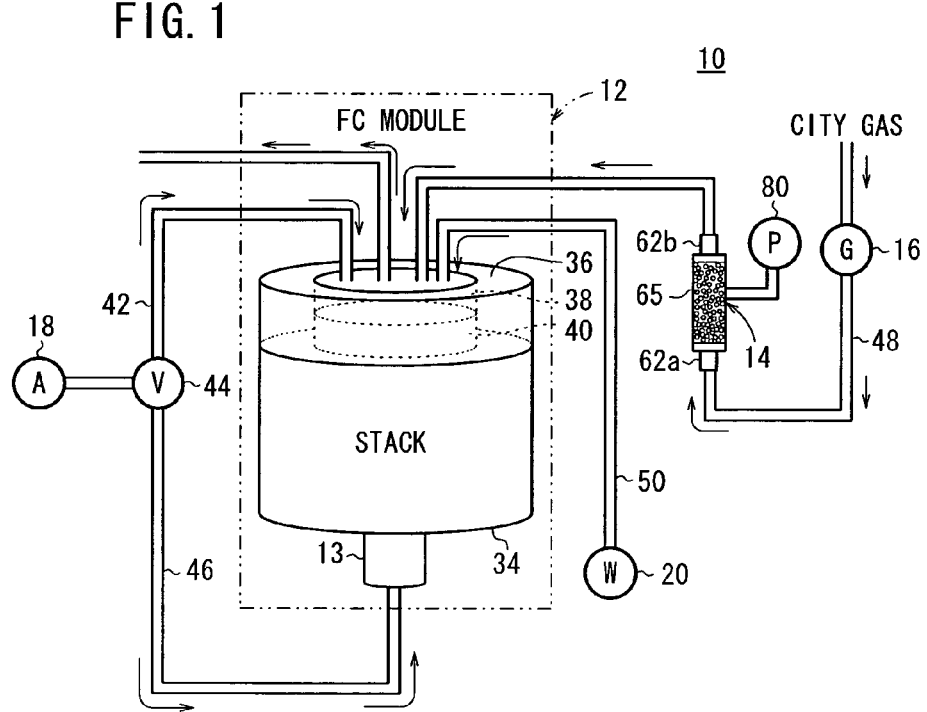
FIG. 1 is a block diagram of a mechanical circuit of a fuel cell system which incorporates a desulfurizer according to a first embodiment of the present invention.

As shown in FIG. 1, a fuel cell system 10 which incorporates a desulfurizer according to a first embodiment of the present invention is used in various applications, e.g., used as a stationary fuel cell system, a vehicle-mounted fuel cell system, or the like.

The fuel cell system 10 comprises a fuel cell module (SOFC module) 12 for generating electrical energy in power generation by electrochemical reactions of a fuel gas (hydrogen gas) and an oxygen-containing gas (air), a combustor 13 (e.g., torch heater) for raising the temperature of the fuel cell module 12, a desulfurizer 14 according to the first embodiment for removing sulfur component from a raw fuel (e.g., city gas) chiefly containing hydrocarbon to produce the fuel gas (more specifically, desulfurized raw fuel), a fuel gas supply apparatus (including a fuel gas pump) 16 for supplying the desulfurized raw fuel to the fuel cell module 12, an oxygen-containing gas supply apparatus 18 (including an air pump) for supplying the oxygen-containing gas to the fuel cell module 12, a water supply apparatus (including a water pump) 20 for supplying water to the fuel cell module 12, a power converter 22 for converting the direct current electrical energy generated in the fuel cell module 12 to electrical energy according to the requirements specification, and a control device 24 for controlling the amount of electrical energy generated in the fuel cell module 12.

The fuel cell module 12 includes a fuel cell stack 34 formed by stacking a plurality of solid oxide fuel cells 32 in a vertical direction. The fuel cells 32 are formed by stacking electrolyte electrode assemblies and separators. Though not shown, each of the electrolyte electrode assemblies includes a cathode, an anode, and a solid electrolyte (solid oxide) interposed between the cathode and the anode. For example, the electrolyte is made of ion-conductive solid oxide such as stabilized zirconia (see FIG. 2).

At an upper end of the fuel cell stack 34 in the stacking direction, a heat exchanger 36 for heating the oxygen-containing gas before the oxygen-containing gas is supplied to the fuel cell stack 34, an evaporator 38 for evaporating water to produce a mixed fuel of a desulfurized raw fuel and water vapor, and a reformer 40 for reforming the mixed fuel to produce a reformed gas are provided.

At a lower end of the fuel cell stack 34 in the stacking direction, a load applying mechanism 41 for applying a tightening load to the fuel cells 32 of the fuel cell stack 34 in the stacking direction indicated by the arrow A is provided.

The reformer 40 is a preliminary reformer for reforming higher hydrocarbon ($C_{2+}$) such as ethane ($C_2H_6$), propane ($C_3H_8$), and butane ($C_4H_{10}$) contained in the desulfurized city gas (fuel gas), into a fuel gas chiefly containing methane ($CH_4$), by steam reforming. The operating temperature of the reformer 40 is several hundred ° C.

The operating temperature of the fuel cell 32 is high, at several hundred ° C. In the electrolyte electrode assembly, methane in the fuel gas is reformed to obtain hydrogen, and the hydrogen is supplied to the anode.

The heat exchanger 36 heats the air, which is a fluid to be heated, by a consumed reactant gas discharged from the fuel cell stack 34 (hereinafter also referred to as the exhaust gas or the combustion exhaust gas). The fuel gas supply apparatus 16 and the desulfurizer 14 are connected to the evaporator 38 through the raw fuel channel 48.

The oxygen-containing gas supply apparatus 18 is connected to the air supply pipe 42, and the air branch channel 46 is connected to a switching valve 44 provided at a position in midstream of the air supply pipe 42. The air branch channel 46 is connected to the combustor 13. For example, the combustor 13 has a torch heater, and the air and electric current are supplied to the combustor 13. The water supply apparatus 20 is connected to the evaporator 38 through a water channel 50. The fuel cell module 12 and the combustor 13 are surrounded by heat insulating material 52.

The fuel gas supply apparatus 16, the oxygen-containing gas supply apparatus 18, and the water supply apparatus 20 are controlled by the control device 24. A detector 54 for detecting the fuel gas is electrically connected to the control device 24. For example, a commercial power source 56 (or other components such as a load or a secondary battery) is connected to the power converter 22.

Figure 3:
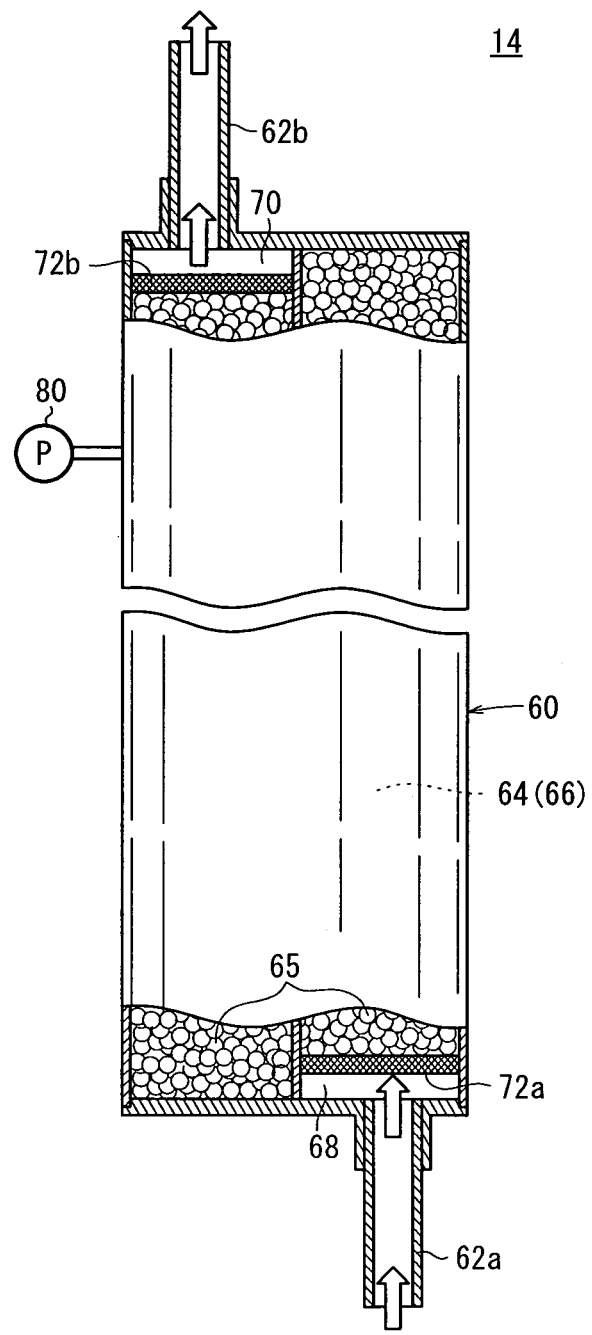
FIG. 3 is a fragmentary front elevational view, partly in cross section, of the desulfurizer according to the first embodiment.
Figure 4:
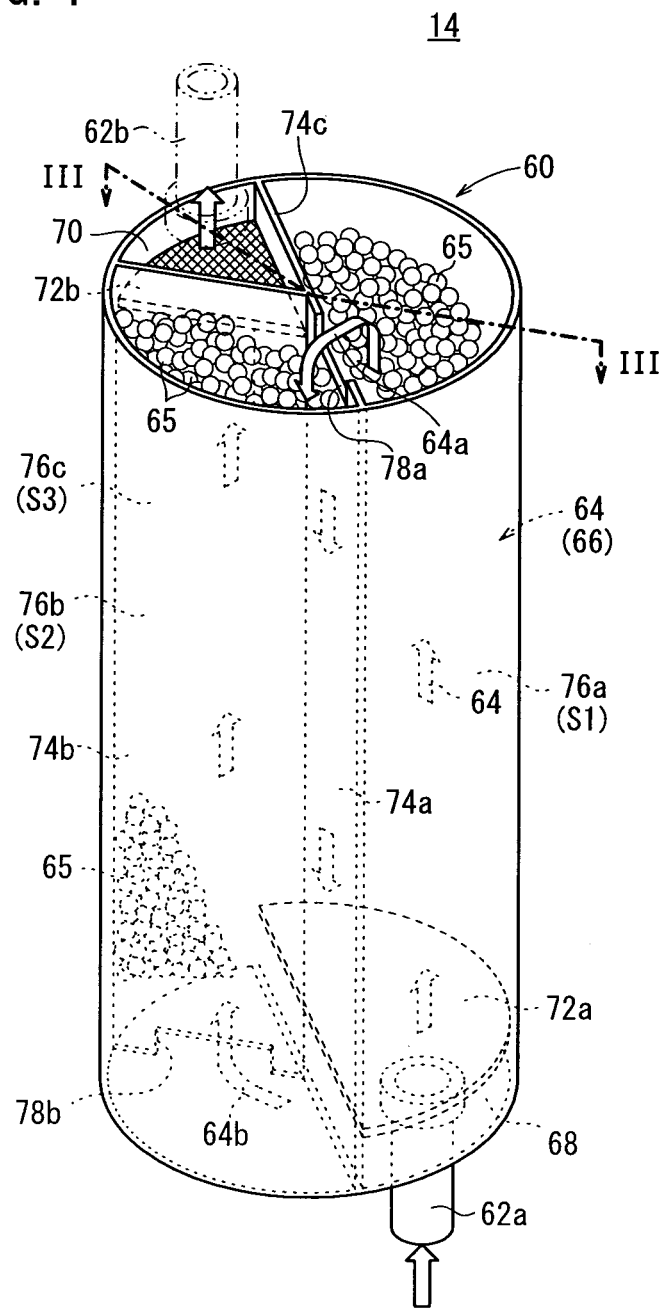
FIG. 4 is a perspective view of the desulfurizer according to the first embodiment.

As shown in FIGS. 3 and 4, the desulfurizer 14 includes a hollow cylindrical tubular body (tubular casing) 60 which extends vertically. The tubular body 60 has a supply port 62a on its lower end for being supplied with a raw fuel and a discharge port 62b on its upper end for discharging a desulfurized raw fuel. The supply port 62a is connected to the outlet side (downstream side) of the fuel gas supply apparatus 16, and the discharge port 62b is connected to the inlet side of the fuel cell module 12.

The tubular body 60 contains therein a filled chamber 66 having a raw fuel passage 64 for passing the raw fuel therethrough and which is filled with a desulfurizing agent 65 for removing sulfur component from the raw fuel to produce a desulfurized raw fuel, a supply chamber 68 defined between an upstream end of the filled chamber 66 and the supply port 62a, for uniformly supplying the raw fuel to the filled chamber 66, and a discharge chamber 70 defined between a downstream end of the filled chamber 66 and the discharge port 62b, for uniformly discharging the desulfurized raw fuel from the filled chamber 66. The raw fuel passage 64 has a first reverser 64a and a second reverser 64b for reversing the direction in which the raw fuel flows, as described in detail later.

The desulfurizer 14 includes a first mesh member 72a which divides the supply chamber 68 and the filled chamber 66 from each other, and a second mesh member 72b which divides the filled chamber 66 and the discharge chamber 70 from each other. Though the desulfurizer 14 includes both the first and second mesh members 72a, 72b in FIG. 4, the desulfurizer 14 may have either one of the first and second mesh members 72a, 72b, rather than both.

Figure 5:
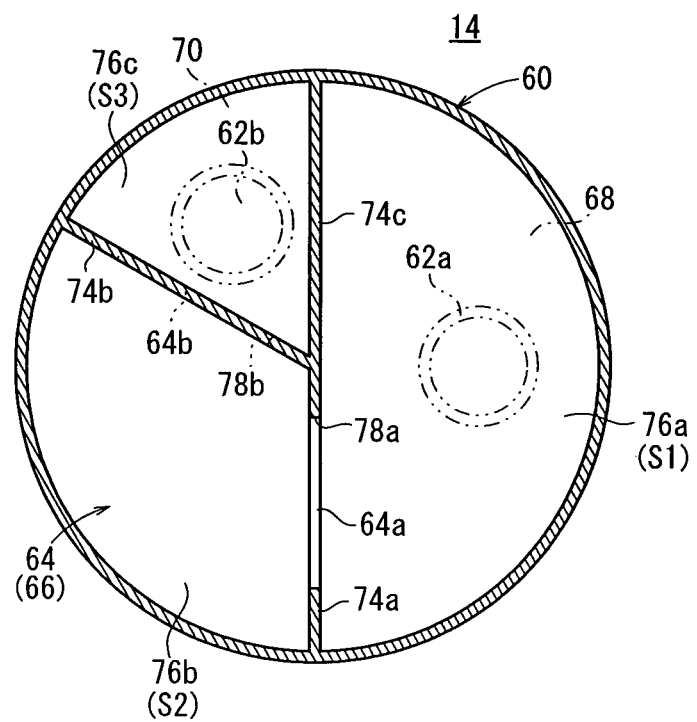
FIG. 5 is a sectional plan view of the desulfurizer according to the first embodiment.

As shown in FIGS. 4 and 5, the tubular body 60 houses therein three partition plates 74a, 74b, 74c extending from the center of the tubular body 60 radially outwardly to the inner circumferential surface of the tubular body 60. These partition plates 74a, 74b, 74c divide the space in the tubular body 60, i.e., the raw fuel passage 64, into a first passage region 76a, a second passage region 76b, and a third passage region 76c.

The first passage region 76a, the second passage region 76b, and the third passage region 76c have respective cross-sectional areas S1, S2, S3 which have the relationship: S1>S2>S3.

The first passage region 76a has a lower end, i.e., an upstream end, held in fluid communication with the supply chamber 68, and an upper end, i.e., a downstream end, held in fluid communication with an upper end, i.e., an upstream end, of the second passage region 76b through a recess 78a which is defined in an upper end portion of the partition plate 74a. The second passage region 76b has a lower end, i.e., a downstream end, held in fluid communication with a lower end, i.e., an upstream end, of the third passage region 76c through a recess 78b which is defined in a lower end portion of the partition plate 74b. The third passage region 76c has an upper end, i.e., a downstream end, held in fluid communication with the discharge chamber 70.

As shown in FIG. 4, the raw fuel passage 64 in the tubular body 60 includes the first passage region 76a that is held in fluid communication with the supply chamber 68, the first reverser 64a that is defined by the recess 78a at the upper end of the first passage region 76a, the second passage region 76b whose cross-sectional area is different from that of the first passage region 76a so that the cross-sectional area of the raw fuel passage 64 changes across the first reverser 64a, the second reverser 64b that is defined by the recess 78b at the lower end of the second passage region 76b, and the third passage region 76c whose cross-sectional area is different from that of the second passage region 76b so that the cross-sectional area of the raw fuel passage 64 changes across the second reverser 64b. The first reverser 64a and the second reverser 64b are arrayed on a circle that is concentric with the center of the tubular body 60 (see FIG. 5).

The raw fuel passage 64 is designed such that the velocity at which the raw fuel flows through the first passage region 76a having the maximum cross-sectional area at a maximum flow rate (i.e., in a rated operation mode) is the same as the velocity at which the raw fuel flows through the third passage region 76c having the minimum cross-sectional area at a minimum flow rate (i.e., in a partial load operation mode).

The desulfurizer 14 may include a pressure-detecting means 80 for detecting the inner pressure thereof. In this case, as shown in FIG. 2, the control device 24 serves as a control means for controlling the pump rotation speed of the fuel gas supply apparatus 16 such that the detected inner pressure of the desulfurizer 14 is kept within a certain range.

Operation of the fuel cell system 10, in relation to the desulfurizer 14 according to the first embodiment, will be described below.

Figure 2:
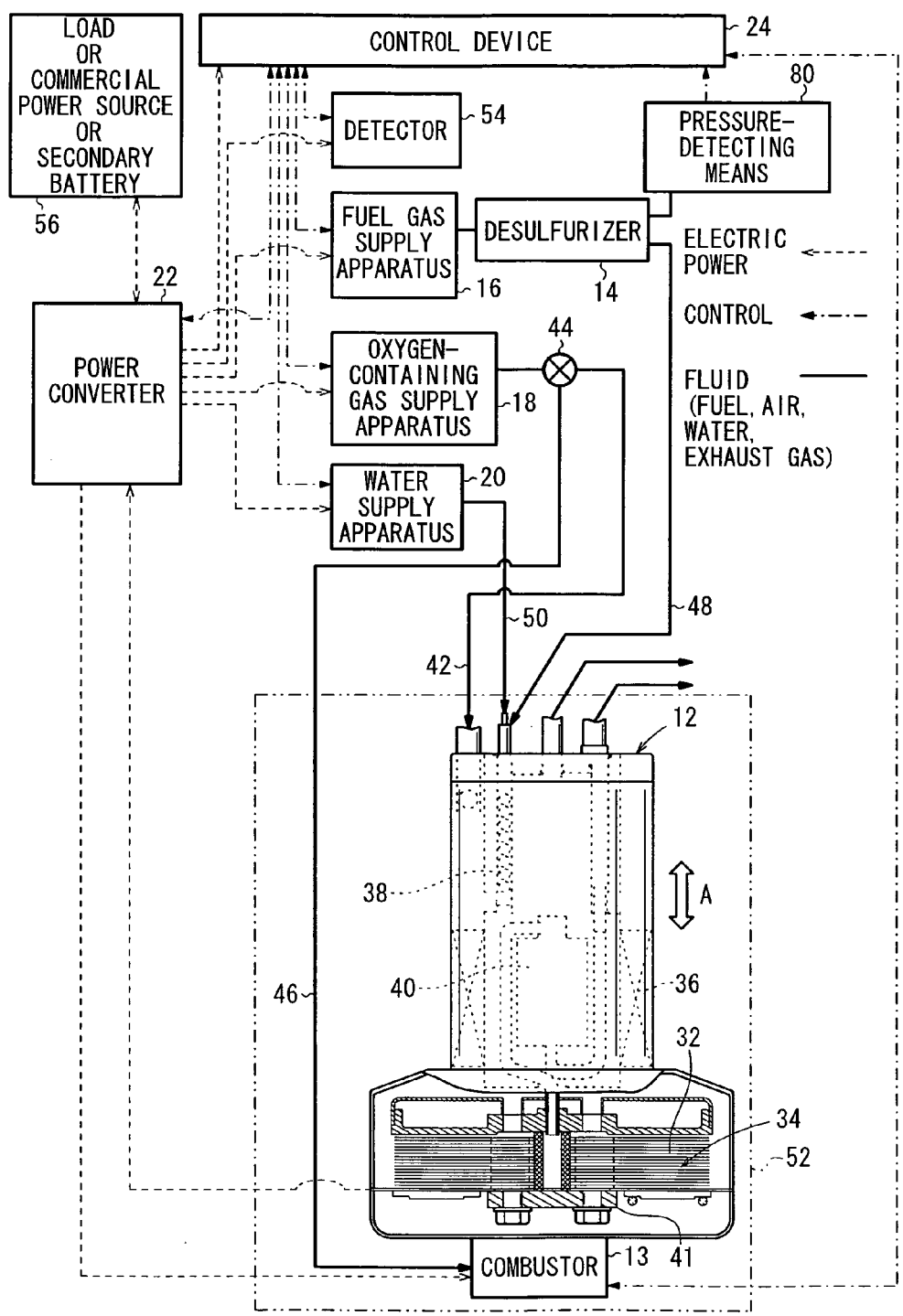
FIG. 2 is a circuit diagram of the fuel cell system.

As shown in FIG. 2, when the fuel gas supply apparatus 16 is operated, it supplies a raw fuel, e.g., a city gas (containing $CH_4$, $C_2H_6$, $C_3H_8$, and $C_4H_{10}$) or the like to the raw fuel channel 48. The raw fuel flows through the desulfurizer 14, and then, a desulfurized raw fuel is obtained.

More specifically, as shown in FIGS. 3 and 4, the raw fuel is introduced into the supply chamber 68 through the supply port 62a on the lower end of the desulfurizer 14. The raw fuel is then supplied uniformly into the first passage region 76a having the maximum cross-sectional area. The raw fuel flows vertically upwardly through the first passage region 76a while being desulfurized by the desulfurizing agent 65.

When the raw fuel reaches the upper end of the first passage region 76a, the raw fuel is reversed in direction by the first reverser 64a, and introduced into the second passage region 76b having the medium cross-sectional area. The raw fuel flows vertically downwardly through the second passage region 76b while being desulfurized by the desulfurizing agent 65. Then, when the raw fuel reaches the lower end of the second passage region 76b, the raw fuel is reversed in direction by the second reverser 64b, and introduced into the third passage region 76c having the minimum cross-sectional area. The raw fuel flows vertically upwardly through the third passage region 76c while being desulfurized by the desulfurizing agent 65. Thereafter, the raw fuel is discharged uniformly into the discharge chamber 70 which is held in fluid communication with the third passage region 76c. Thus, the desulfurized raw fuel is discharged from the discharge port 62b into the raw fuel channel 48.

On the other hand, as shown in FIG. 2, when the water supply apparatus 20 is operated, it supplies water to the water channel 50. When the oxygen-containing gas supply apparatus 18 is operated, it supplies an oxygen-containing gas, e.g., air, to the air supply pipe 42.

Thus, the evaporator 38 mixes the desulfurized raw fuel flowing through the raw fuel channel 48 with water vapor to produce a mixed fuel. The reformer 40 reforms the mixed fuel by steam-reforming, and removes (reforms) hydrocarbon of $C_{2+}$ to produce a reformed gas chiefly containing methane. The reformed gas flows through an outlet of the reformer 40, and is supplied to the fuel cell stack 34. Thus, the methane in the reformed gas is reformed, and hydrogen gas is then obtained. The fuel gas which primarily contains the hydrogen gas is supplied to the anodes, not shown, of the fuel cells 32.

The air supplied from the air supply pipe 42 to the heat exchanger 36 moves along the heat exchanger 36, and is heated to a predetermined temperature by heat exchange with the exhaust gas (to be described later). The air heated by the heat exchanger 36 is supplied to the fuel cell stack 34, and the air is supplied to the cathodes (not shown).

Thus, in each of the electrolyte electrode assemblies, by electrochemical reactions of the fuel gas and the air, power generation is performed. The hot exhaust gas (several hundred ° C.) discharged to the outer circumferential region of each of the electrolyte electrode assemblies flows through the heat exchanger 36, and heat exchange with the air is carried out. The air is heated to a predetermined temperature, and the temperature of the exhaust gas is decreased.

When the exhaust gas moves along the evaporator 38, the water passing through the water channel 50 is evaporated. After the exhaust gas passes through the evaporator 38, the exhaust gas is discharged to the outside.

According to the first embodiment, since the raw fuel that is supplied to the desulfurizer 14 is temporarily stored in the supply chamber 68, the raw fuel is supplied uniformly to the entire area of the first passage region 76a. The desulfurized raw fuel flows from the filled chamber 66 and is temporarily stored in the discharge chamber 70. Therefore, the desulfurized raw fuel is discharged uniformly from the entire area of the third passage region 76c. Consequently, the entire area of the desulfurizing agent 65 can effectively be utilized, whereby desulfurizing efficiency is easily improved.

Further, the raw fuel passage 64 has the first reverser 64a and the second reverser 64b for reversing the direction in which the raw fuel flows. Therefore, the overall length of the desulfurizer 14 is reduced, whereas the raw fuel passage 64 is effectively elongated. Since the raw fuel and the desulfurizing agent 65 are held in contact with each other over a long period of time, the desulfurizer 14 has a high desulfurizing capability.

Furthermore, the cross-sectional area of the raw fuel passage 64 is smaller in its downstream portion than in its upstream portion. Specifically, the raw fuel passage 64 includes the first passage region 76a having the maximum cross-sectional area S1, the second passage region 76b having the medium cross-sectional area S2, and the third passage region 76c having the minimum cross-sectional area S3, the first through third passage regions 76a, 76b, 76c being successively arranged in the order named from upstream toward downstream with respect to the direction in which the raw fuel flows.

In a partial load operation mode, the raw fuel flows through the third passage region 76c having the minimum cross-sectional area (if necessary, also through the second passage region 76b) at a minimum flow velocity. In a rated operation mode, the raw fuel flows through the entire raw fuel passage 64 (including the first through third passage regions 76a, 76b, 76c) at a minimum flow velocity.

If the flow velocity of the raw fuel becomes lower than the minimum flow velocity (e.g., 1 m/s) in the desulfurizer 14, then the raw fuel tends to flow unevenly, causing a certain region of the desulfurizing agent 65 to be deteriorated rapidly, and hence making it less durable. If the raw fuel passage 64 comprises only passage regions having a small cross-sectional area in order to prevent the raw fuel from flowing unevenly, then the raw fuel passage 64 needs to be elongated in order to achieve a desired desulfurizing capability, and hence is liable to cause a high pressure loss in the rated operation mode.

According to the first embodiment, the raw fuel passage 64 includes the first passage region 76a, the second passage region 76b, and the third passage region 76c which have different cross-sectional areas. In a wide operating range, the raw fuel passage 64 thus constructed is effective to prevent uneven flow distribution of the raw fuel and to prevent a pressure loss from occurring, and is also effective to utilize the desulfurizing agent 65 in its entirety over a long period of time. The desulfurizer 14 is therefore highly durable and can be serviced for maintenance at increased time intervals.

The first passage region 76a, the second passage region 76b, and the third passage region 76c are arranged such that their cross-sectional areas are successively smaller from upstream toward downstream in the order named with respect to the direction in which the raw fuel flows. Accordingly, the raw fuel passage 64 has a function as a pressure regulation chamber (buffer tank). Even if the fuel gas supply apparatus 16 causes raw fuel pulsation flows, the raw fuel passage 64, i.e., the desulfurizer 14, absorbs such raw fuel pulsation flows. The fuel cell module 12 is thus prevented from producing unstable electric output levels.

In the desulfurizer 14, the cross-sectional area of the first passage region 76a is reduced to the cross-sectional area of the second passage region 76b by passing through the first reverser 64a, and the cross-sectional area of the second passage region 76b is reduced to the cross-sectional area of the third passage region 76c by passing through the second reverser 64b. The desulfurizer 14 has the hollow cylindrical tubular body 60, and the first reverser 64a and the second reverser 64b are arrayed on a circle that is concentric with the center of the tubular body 60.

Therefore, the raw fuel passage 64 is effectively elongated while the overall length of the desulfurizer 14 is reduced. As the raw fuel and the desulfurizing agent 65 are held in contact with each other over a long period of time, the desulfurizer 14 has a high desulfurizing capability. Moreover, the desulfurizer 14 is simplified in structure and reduced in size.

The desulfurizer 14 has the discharge port 62b held in fluid communication with the discharge chamber 70, and the downstream second reverser 64b is positioned below the discharge port 62b. Accordingly, the raw fuel flows through the raw fuel passage 64 upwardly toward the discharge port 62b, and hence is kept in contact with the desulfurizing agent 65 over a long period of time. The desulfurizer 14 has a high desulfurizing capability and is reduced in size.

When the desulfurizing agent 65 is deteriorated and fragmented into small pieces after it has been used over a long period of time, since the raw fuel flows upwardly as an upward flow, the fragmented pieces of the desulfurizing agent 65 are prevented from accumulating in a lower portion of the desulfurizer 14. Accordingly, the raw fuel is enabled to effectively flow through the desulfurizing agent 65, so that the overall area of the desulfurizing agent 65 can effectively be utilized and the desulfurizing agent 65 can be used over a long period of time. In addition, the fragmented pieces of the desulfurizing agent 65 are prevented from flowing downstream of the desulfurizer 14. Consequently, any pressure losses and auxiliary losses caused by devices connected downstream of the desulfurizer 14, e.g., the reformer 40, the fuel cell module 12, pipes, etc., are reduced, and those devices are increased in efficiency and service life.

According to the first embodiment, the raw fuel passage 64 has an even number of (two) reversers, i.e., the first reverser 64a and the second reverser 64b. Therefore, the supply chamber 68 and the discharge chamber 70 are allowed to be positioned on the respective opposite ends of the desulfurizer 14. Therefore, the pipe for supplying the raw fuel and the pipe for discharging the desulfurized raw fuel are not placed closely together, but are easily positioned and connected to the desulfurizer 14.

Further, the supply port 62a which is held in fluid communication with the supply chamber 68 is positioned below the discharge port 62b which is held in fluid communication with the discharge chamber 70. Since the raw fuel flows through the raw fuel passage 64 from the lower supply port 62a to the upper discharge port 62b, the raw fuel and the desulfurizing agent 65 are kept in contact with each other over a long period of time. Therefore, the desulfurizer 14 has a high desulfurizing capability and is reduced in size.

When the desulfurizing agent 65 is deteriorated and fragmented into small pieces after it has been used over a long period of time, since the raw fuel flows upwardly as an upward flow, the fragmented pieces of the desulfurizing agent 65 are prevented from accumulating in a lower portion of the desulfurizer 14. Accordingly, the raw fuel is enabled to effectively flow through the desulfurizing agent 65, so that the overall area of the desulfurizing agent 65 can effectively be utilized and the desulfurizing agent 65 can be used over a long period of time. In addition, the fragmented pieces of the desulfurizing agent 65 are prevented from flowing downstream of the desulfurizer 14. Consequently, any pressure losses and auxiliary losses caused by devices connected downstream of the desulfurizer 14, e.g., the reformer 40, the fuel cell module 12, pipes, etc., are reduced, and those devices are increased in efficiency and service life.

The raw fuel passage 64 includes the first passage region 76a, the second passage region 76b, and the third passage region 76c, such that the cross-sectional area of the raw fuel passage 64 is reduced stepwise from upstream toward downstream across the first reverser 64a and the second reverser 64b. Though the present invention is simple in structure, the following is achieved. That is, in a partial load operation mode, the raw fuel flows through the third passage region 76c having the minimum cross-sectional area (if necessary, also through the second passage region 76b) at a minimum flow velocity, and in a rated operation mode, the raw fuel flows through the entire raw fuel passage 64 (including the first through third passage regions 76a, 76b, 76c) at a minimum flow velocity.

Accordingly, in a wide operating range, the raw fuel passage 64 thus constructed is effective to prevent uneven flow distribution of the raw fuel, and to utilize the desulfurizing agent 65 in its entirety over a long period of time. The desulfurizer 14 is therefore highly durable and can be serviced for maintenance at increased time intervals.

In addition, the desulfurizer 14 has a function as a pressure regulation chamber. Therefore, the desulfurizer 14 can stably supply the desulfurized raw fuel, thus enabling the fuel cells 32 to operate stably.

Furthermore, the raw fuel passage 64 is designed such that the velocity at which the raw fuel flows through the first passage region 76a at a maximum flow rate is the same as the velocity at which the raw fuel flows through the third passage region 76c at a minimum flow rate. Therefore, in a partial load operation mode, the raw fuel flows through the third passage region 76c at a minimum flow velocity, and in a rated operation mode, the raw fuel flows through the entire raw fuel passage 64 at a minimum flow velocity.

Accordingly, in a wide operating range, the raw fuel passage 64 is effective to prevent uneven flow distribution of the raw fuel, and to utilize the desulfurizing agent 65 in its entirety over a long period of time. The desulfurizer 14 is therefore highly durable and can be serviced for maintenance at increased time intervals.

The desulfurizer 14 includes the first mesh member 72a which divides the supply chamber 68 and the filled chamber 66 from each other, and the second mesh member 72b which divides the filled chamber 66 and the discharge chamber 70 from each other. The first mesh member 72a is capable of removing dust particles and foreign matter from the raw fuel and also of preventing the fragmented desulfurizing agent 65 from flowing upstream toward the supply port 62a. The second mesh member 72b is capable of preventing the fragmented desulfurizing agent 65 from flowing downstream toward the discharge port 62b.

Further, the fuel cell module 12 comprises a solid oxide fuel cell (SOFC) module used for a high-temperature fuel cell system. Thus, the fuel cell system 10 which incorporates the fuel cells 32 having a wide operating range is capable of suitably preventing uneven flow distribution and pulsation flows, and can be reduced in size. In addition, temperature changes are suppressed, and hence, such a fuel cell system is optimum for use as a high-temperature fuel cell system.

Incidentally, instead of the solid oxide fuel cell module, the present invention is also suitably applicable to other types of fuel cell modules. For example, molten carbonate fuel cells (MCFC), phosphoric acid fuel cells (PAFC), hydrogen membrane fuel cells (HMFC), solid polymer electrolyte fuel cells (PEFC), etc can be adopted suitably.

Figure 6:
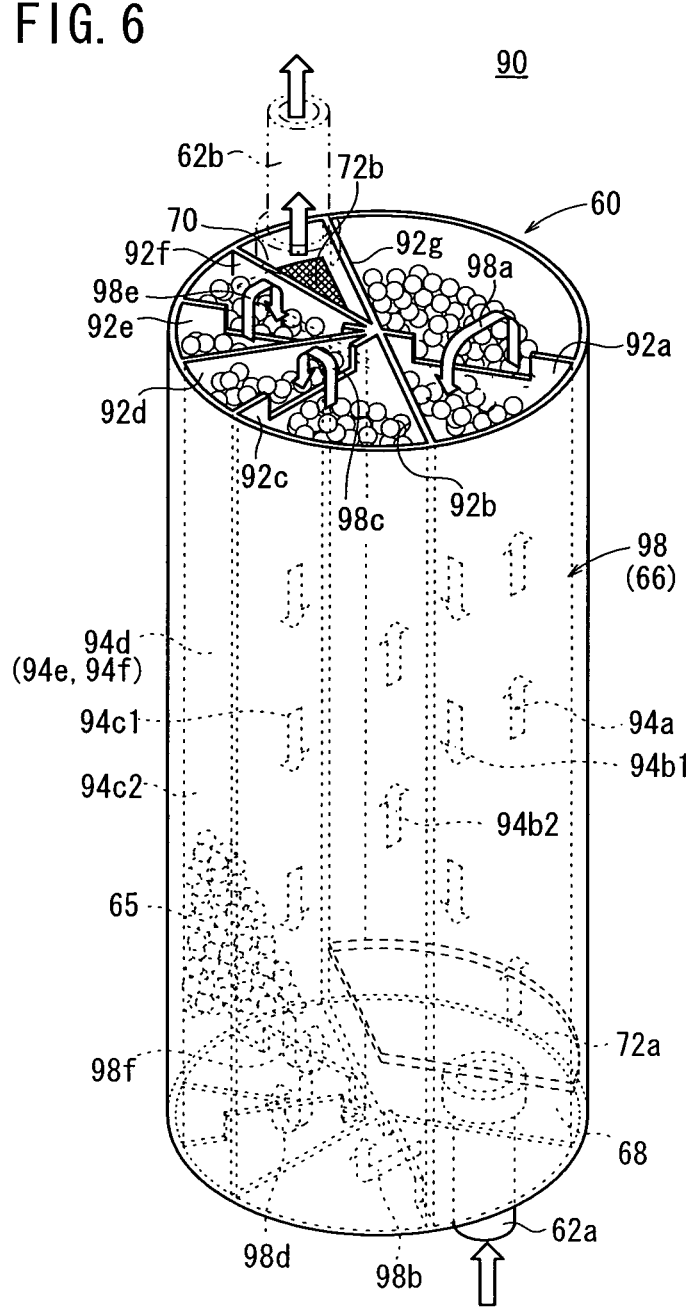
FIG. 6 is a perspective view of a desulfurizer according to a second embodiment of the present invention.
Figure 7:
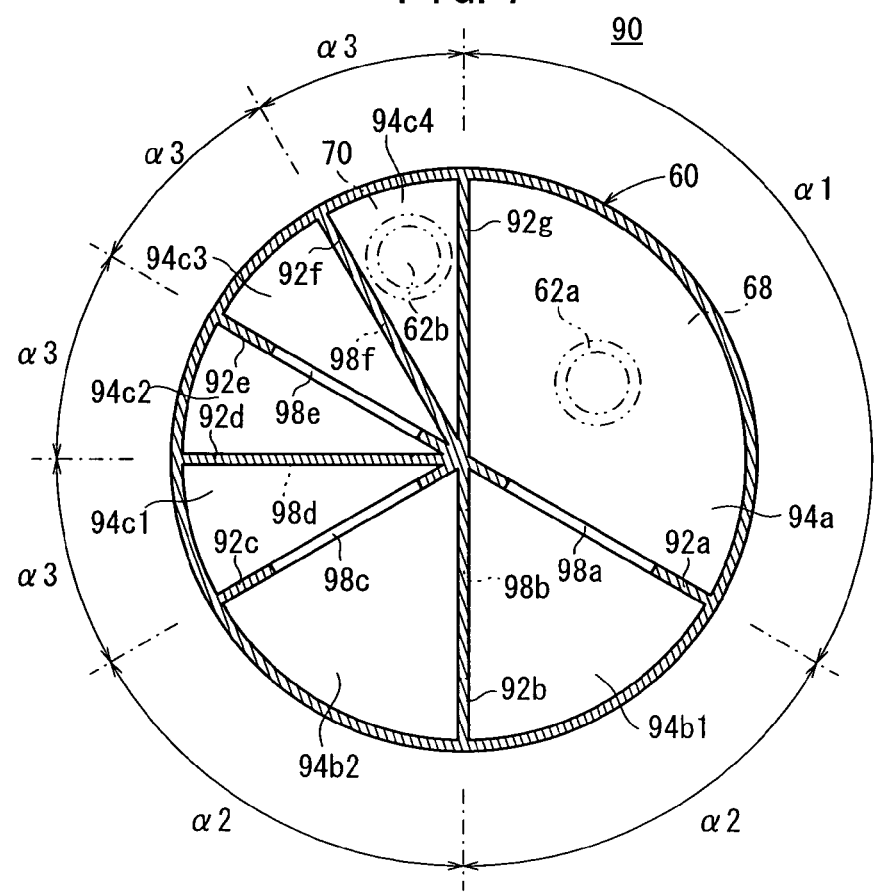
FIG. 7 is a sectional plan view of the desulfurizer according to the second embodiment.
Figure 8:
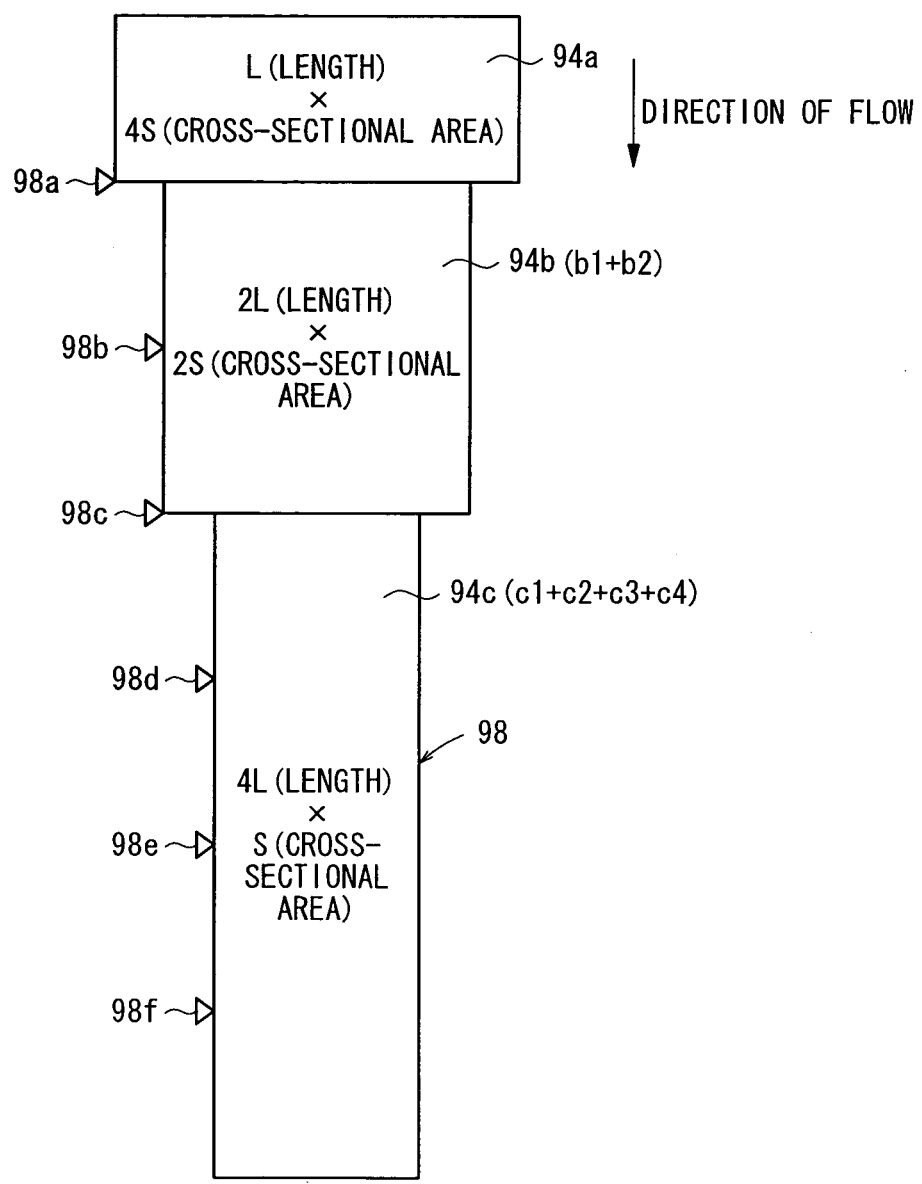
FIG. 8 is a schematic diagram showing an expanded representation of a raw fuel passage in the desulfurizer according to the second embodiment.

FIG. 6 is a perspective view of a desulfurizer 90 according to a second embodiment of the present invention. FIG. 7 is a sectional plan view of the desulfurizer 90. FIG. 8 is a schematic diagram showing an expanded representation of a raw fuel passage in the desulfurizer 90.

Those parts of the desulfurizer 90 which are identical to those of the desulfurizer 14 according to the first embodiment are denoted by identical reference characters, and will not be described in detail below. Similarly, those parts of desulfurizers according to third through fifth embodiments to be described below which are identical to those of the desulfurizer 14 according to the first embodiment are denoted by identical reference characters, and will not be described in detail below.

As shown in FIG. 7, the desulfurizer 90 comprises a hollow cylindrical tubular body 60 which houses therein a plurality of partition plates 92a through 92g extending from the center of the tubular body 60 radially outwardly to the inner circumferential surface of the tubular body 60. These partition plates 92a through 92g divide the space in the tubular body 60 into a first passage region 94a, two second passage regions 94b1, 94b2, and four third passage regions 94c1, 94c2, 94c3, 94c4.

The partition plates 92a, 92g are angularly spaced from each other by an angle $\alpha 1$ of 120°. The partition plates 92a, 92b are angularly spaced from each other by an angle $\alpha 2$ of 60°. The partition plates 92b, 92c are angularly spaced from each other by an angle $\alpha 2$ of 60°. The partition plates 92c, 92d are angularly spaced from each other by an angle $\alpha 3$ of 30°. The partition plates 92d, 92e are angularly spaced from each other by an angle $\alpha 3$ of 30°. The partition plates 92e, 92f are angularly spaced from each other by an angle $\alpha 3$ of 30°. The partition plates 92f, 92g are angularly spaced from each other by an angle $\alpha 3$ of 30°.

The partition plates 92a, 92g jointly define therebetween a first passage region 94a having a maximum cross-sectional area. The partition plates 92a, 92b and the partition plates 92b, 92c jointly define therebetween respective second passage regions 94b1, 94b2 each having a medium cross-sectional area. The partition plates 92c, 92d, the partition plates 92d, 92e, the partition plates 92e, 92f, and the partition plates 92f, 92g jointly define therebetween respective third passage regions 94c1, 94c2, 94c3, 94c4 each having a minimum cross-sectional area.

The partition plate 92a has a first reverser 98a defined in an upper end portion thereof by a recess. The partition plate 92b has a second reverser 98b defined in a lower end portion thereof by a recess. The partition plate 92c has a third reverser 98c defined in an upper end portion thereof by a recess. The partition plate 92d has a fourth reverser 98d defined in a lower end portion thereof by a recess. The partition plate 92e has a fifth reverser 98e defined in an upper end portion thereof by a recess. The partition plate 92f has a sixth reverser 98f defined in a lower end portion thereof by a recess.

As schematically shown in FIG. 8, the desulfurizer 90 has a raw fuel passage 98. The raw fuel passage 98 includes the first passage region 94a, a second passage region 94b which refers to a combination of the second passage regions 94b1, 94b2, and a third passage region 94c which refers to a combination of the third passage regions 94c1, 94c2, 94c3, 94c4. The first passage region 94a, the second passage region 94b, and the third passage region 94c have the same volume as each other.

According to the second embodiment, firstly, a raw fuel that is introduced into the supply chamber 68 from the supply port 62a on the lower end of the desulfurizer 90 is supplied to the first passage region 94a having the maximum cross-sectional area, and flows upwardly through the first passage region 94a. Then, the raw fuel is reversed in direction by the first reverser 98a, and introduced into the second passage region 94b1 having the medium cross-sectional area.

The raw fuel flows downwardly through the second passage region 94b1, and then is reversed in direction by the second reverser 98b. Thereafter, the raw fuel is introduced into the second passage region 94b2, and flows upwardly through the second passage region 94b2. The raw fuel which has reached the upper end of the second passage region 94b2 is reversed in direction by the third reverser 98c. Thereafter, the raw fuel is introduced into the third passage region 94c1 having the minimum cross-sectional area, and flows downwardly through the third passage region 94c1.

The raw fuel is reversed in direction by the fourth reverser 98d, and is introduced into the third passage region 94c2 and flows upwardly through the third passage region 94c2. Thereafter, the raw fuel is reversed in direction by the fifth reverser 98e, and is introduced into the third passage region 94c3 and flows downwardly through the third passage region 94c3. The raw fuel is reversed in direction by the sixth reverser 98f, is introduced into the third passage region 94c4 and flows upwardly through the third passage region 94c4. Thereafter, the raw fuel is discharged from the discharge chamber 70 into the discharge port 62b.

Thus, the desulfurizer 90 according to the second embodiment offers the same advantages as the desulfurizer 14 according to the first embodiment. In addition, the first passage region 94a, the second passage region 94b, and the third passage region 94c have the same volume as each other, while the first passage region 94a, the second passage region 94b, and the third passage region 94c have different cross-sectional areas.

In a partial load operation mode, the raw fuel is desulfurized mainly in the region of the raw fuel passage 98 that has a smaller cross-sectional area, e.g., in the third passage region 94c. In a rated operation mode, the raw fuel is desulfurized in the entire regions of the raw fuel passage 98, i.e., the first passage region 94a, the second passage region 94b, and the third passage region 94c. Accordingly, the desulfurizer 90 is capable of stably desulfurizing the raw fuel in a wide operating range, and is highly durable.

Figure 9:
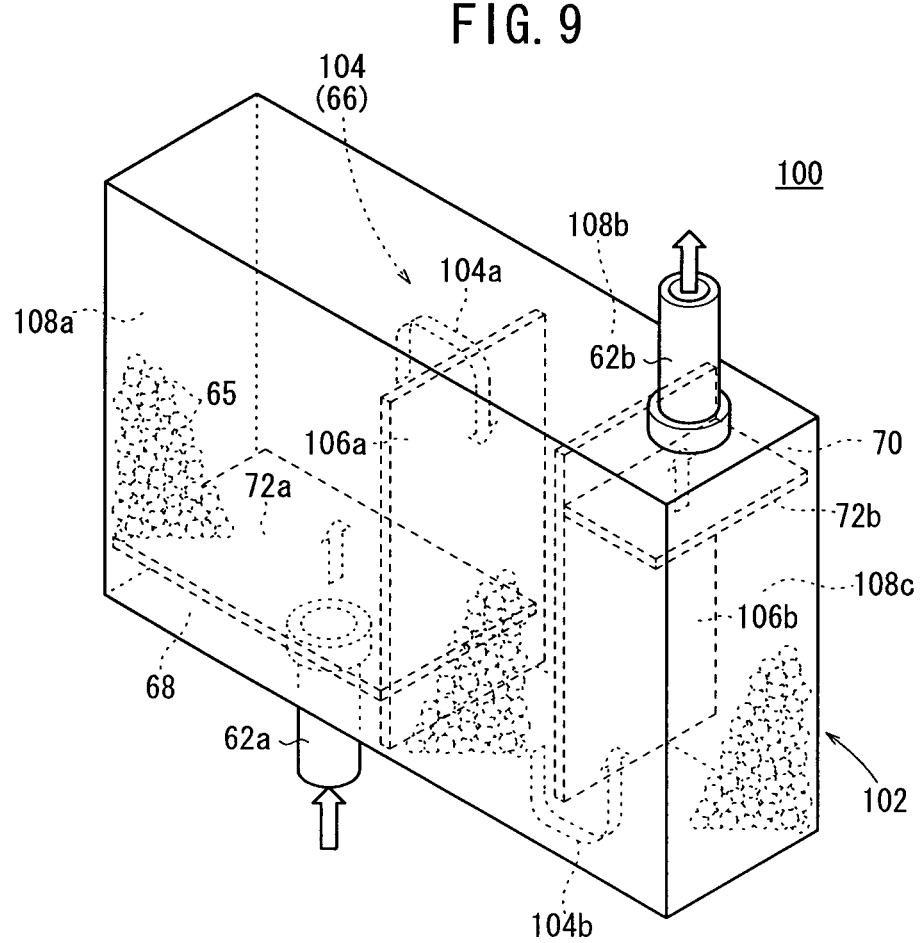
FIG. 9 is a perspective view of a desulfurizer according to a third embodiment of the present invention.
Figure 10:
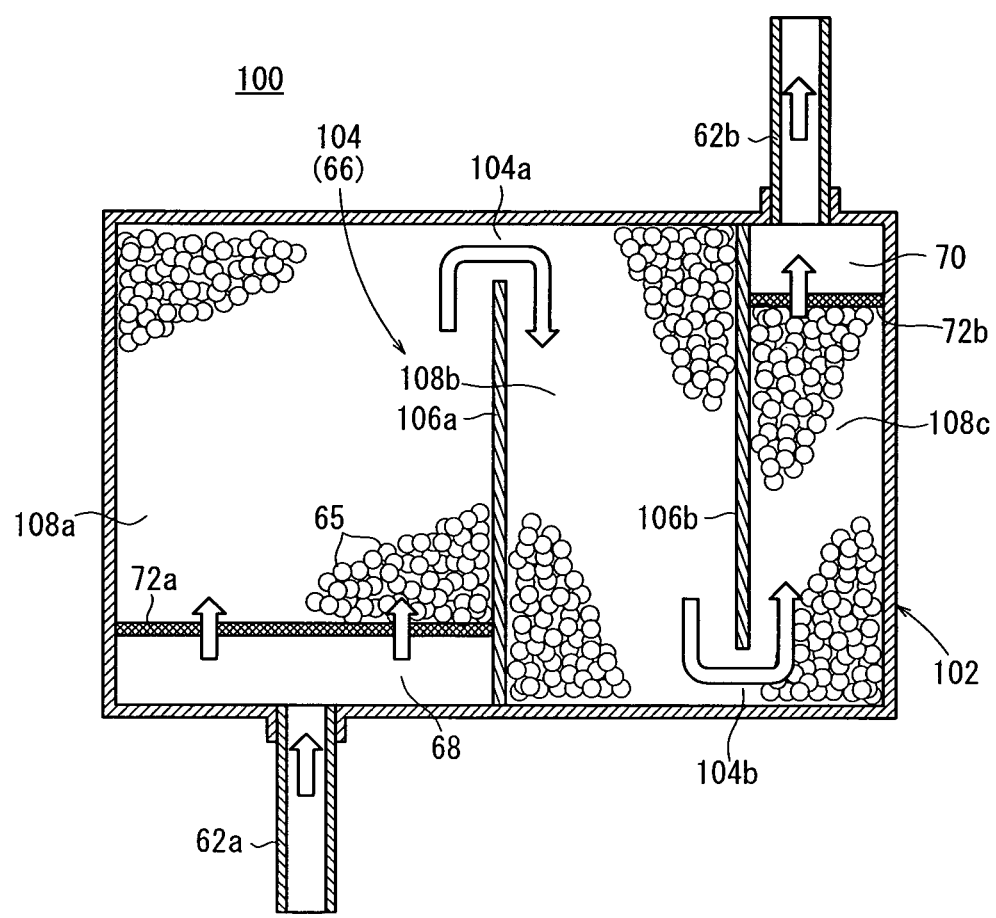
FIG. 10 is a sectional side elevational view of the desulfurizer according to the third embodiment.

FIG. 9 is a perspective view of a desulfurizer 100 according to a third embodiment of the present invention, and FIG. 10 is a sectional side elevational view of the desulfurizer 100.

As shown in FIGS. 9 and 10, the desulfurizer 100 includes a box-shaped casing 102 having a supply chamber 68 defined in a lower portion near one end thereof and held in fluid communication with a supply port 62a on the lower end of the casing 102, and a discharge chamber 70 defined in an upper portion near the other end thereof and held in fluid communication with a discharge port 62b on the upper end of the casing 102. The casing 102 defines therein a filled chamber 66 including a raw fuel passage 104 which has a first reverser 104a and a second reverser 104b for reversing the direction in which the raw fuel flows.

The casing 102 includes partition plates 106a, 106b disposed therein. The first reverser 104a is formed by cutting off an upper end portion of the partition plate 106a, and the second reverser 104b is formed by cutting off a lower end portion of the partition plate 106b. The raw fuel passage 104 includes a first passage region 108a formed on the upstream side thereof and having a maximum cross-sectional area, a second passage region 108b formed on the downstream side of the first passage region 108a and having a medium cross-sectional area, and a third passage region 108c formed on the downstream side of the second passage region 108b and having a medium cross-sectional area.

The first passage region 108a, the second passage region 108b, and the third passage region 108c have respective cross-sectional areas such that the cross-sectional area of the raw fuel passage 104 is reduced stepwise from upstream toward downstream across the first reverser 104a and the second reverser 104b. The desulfurizer 100 according to the third embodiment offers the same advantages as the desulfurizer 14, 90 according to the first and second embodiments. In addition, the desulfurizer 100 according to the third embodiment is simpler in structure and hence more economical.

Figure 11:
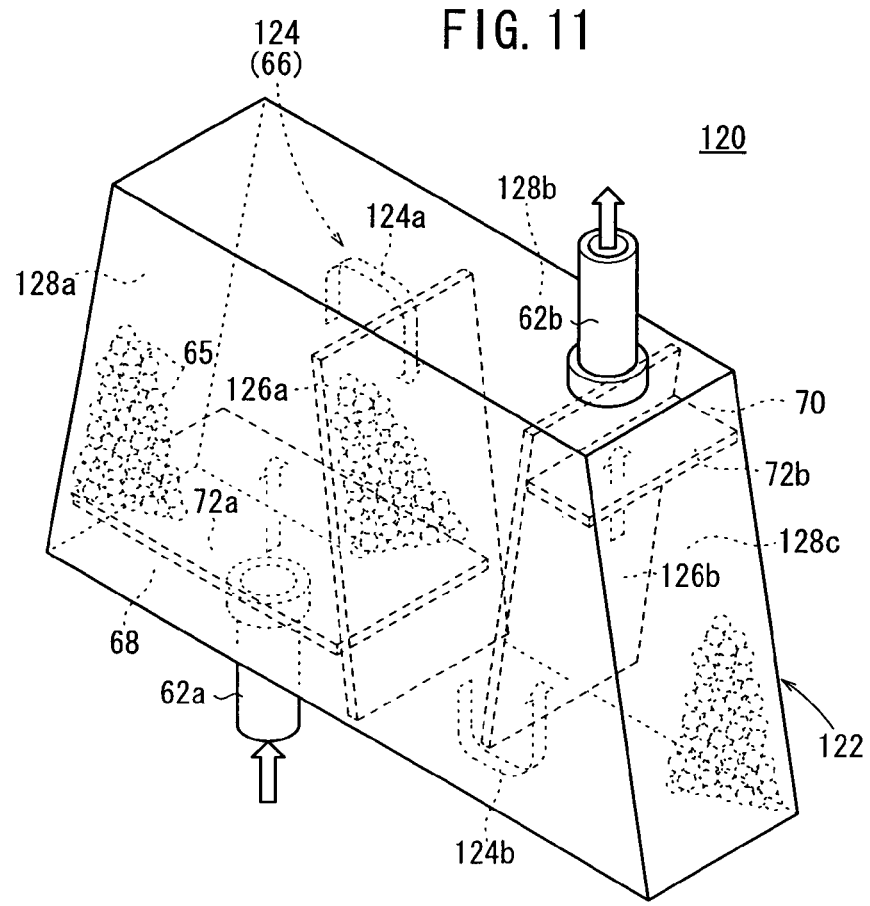
FIG. 11 is a perspective view of a desulfurizer according to a fourth embodiment of the present invention.
Figure 12:
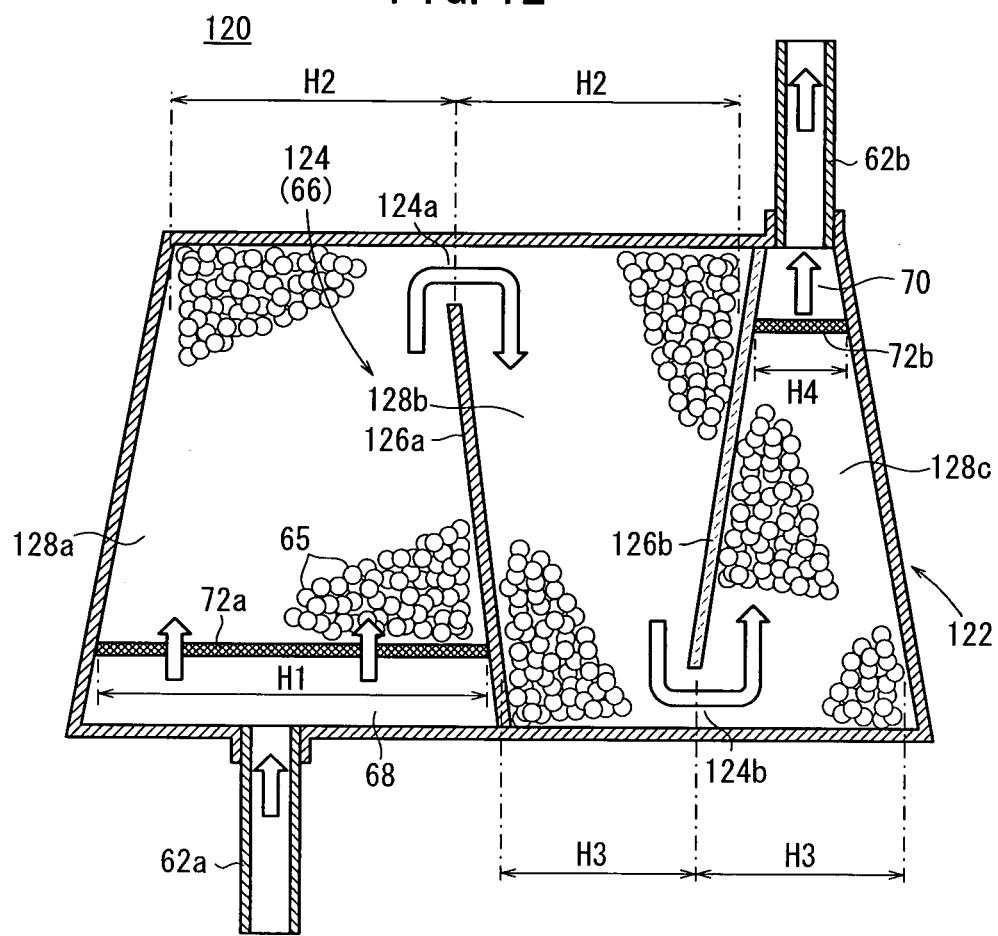
FIG. 12 is a sectional side elevational view of the desulfurizer according to the fourth embodiment.

FIG. 11 is a perspective view of a desulfurizer 120 according to a fourth embodiment of the present invention, and FIG. 12 is a sectional side elevational view of the desulfurizer 120.

As shown in FIGS. 11 and 12, the desulfurizer 120 includes a casing 122, which is essentially trapezoidal as seen from front. The casing 122 has a supply chamber 68 defined in a lower portion near one end thereof and held in fluid communication with a supply port 62a on the lower end of the casing 122, and a discharge chamber 70 defined in an upper portion near the other end thereof and held in fluid communication with a discharge port 62b on the upper end of the casing 122. The casing 122 defines therein a raw fuel passage 124 which has a first reverser 124a and a second reverser 124b for reversing the direction in which the raw fuel flows.

The casing 122 includes two partition plates 126a, 126b disposed therein which are inclined in respective directions. The first reverser 124a is formed by cutting off an upper end portion of the partition plate 126a, and the second reverser 124b is formed by cutting off a lower end portion of the partition plate 126b.

The raw fuel passage 124 includes a first passage region 128a having a maximum cross-sectional area, a second passage region 128b having a medium cross-sectional area, and a third passage region 128c having a minimum cross-sectional area. The first passage region 128a, the second passage region 128b, and the third passage region 128c are defined by the partition plates 126a, 126b.

The first passage region 128a has a maximum width H1 at its upstream inlet end and a minimum width H2 at its downstream outlet end. The second passage region 128b has a maximum width H2 at its upstream inlet end and a minimum width H3 at its downstream outlet end. The third passage region 128c has a maximum width H3 at its upstream inlet end and a minimum width H4 at its downstream outlet end.

Thus, in the raw fuel passage 124, the first passage region 128a, the second passage region 128b, and the third passage region 128c have respective cross-sectional areas progressively continuously reduced from upstream toward downstream. The desulfurizer 120 according to the fourth embodiment offers the same advantages as the desulfurizer according to the first, second, and third embodiments. In addition, since the cross-sectional area of the raw fuel passage 124 is progressively continuously reduced from the supply chamber 68 toward the discharge chamber 70, the desulfurizer 120 according to the fourth embodiment is capable of preventing a pressure loss from increasing as much as possible.

Figure 13:
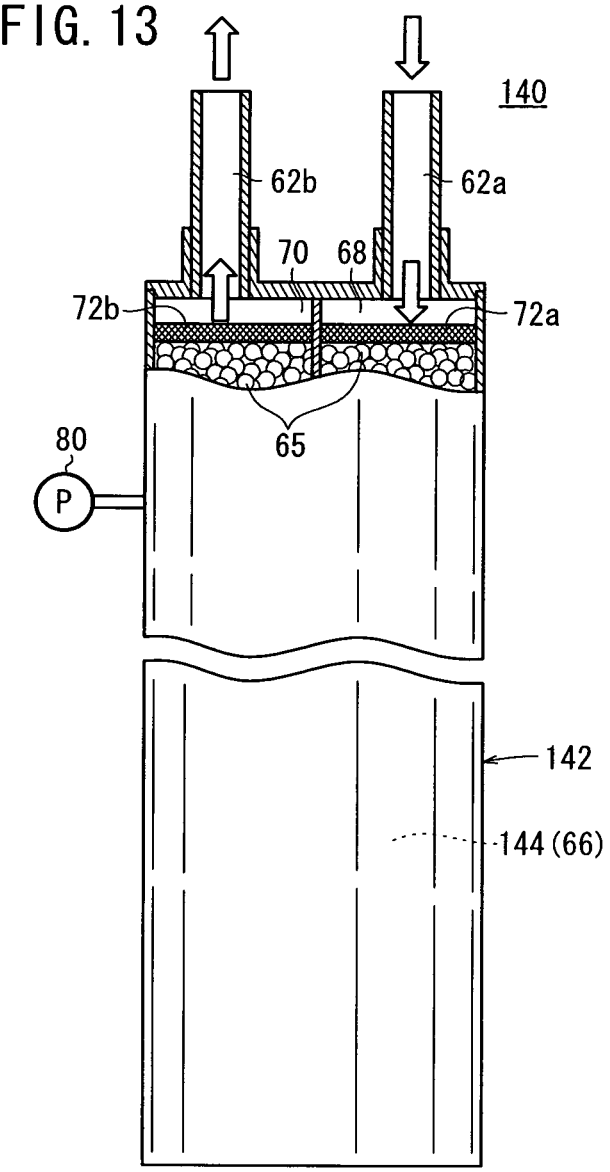
FIG. 13 is a fragmentary front elevational view, partly in cross section, of a desulfurizer according to a fifth embodiment of the present invention.
Figure 14:
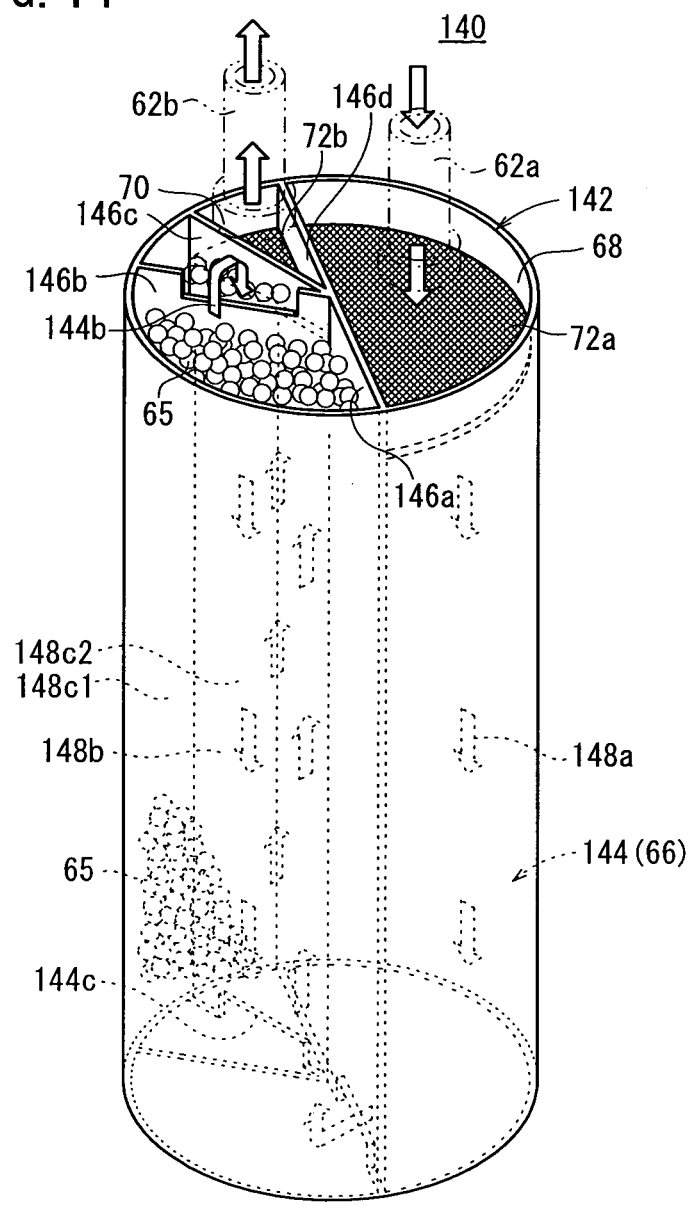
FIG. 14 is a perspective view of the desulfurizer according to the fifth embodiment.

FIG. 13 is a fragmentary front elevational view, partly in cross section, of a desulfurizer 140 according to a fifth embodiment of the present invention. FIG. 14 is a perspective view of the desulfurizer 140, and FIG. 15 is a sectional plan view of the desulfurizer 140.

Figure 15:
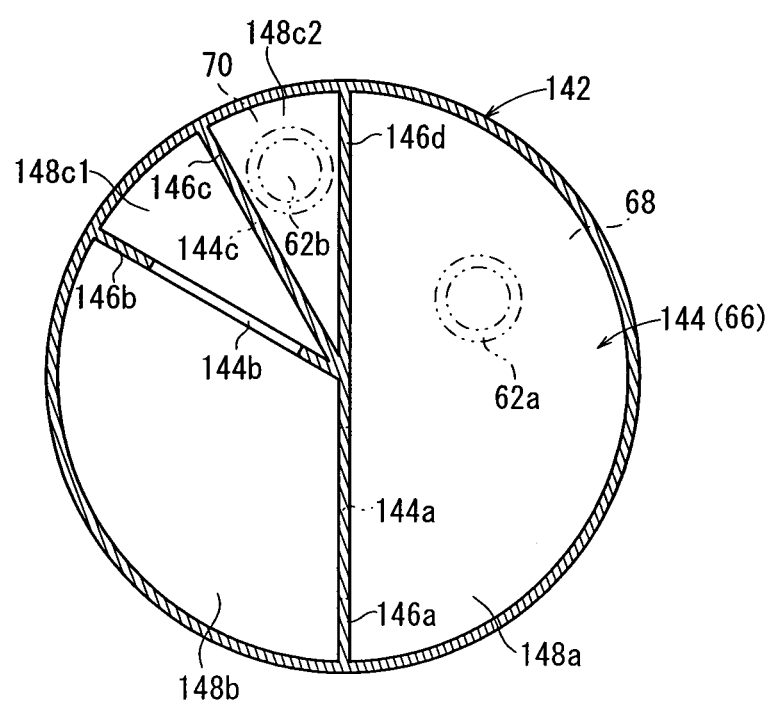
FIG. 15 is a sectional plan view of the desulfurizer according to the fifth embodiment.
Figure 16:
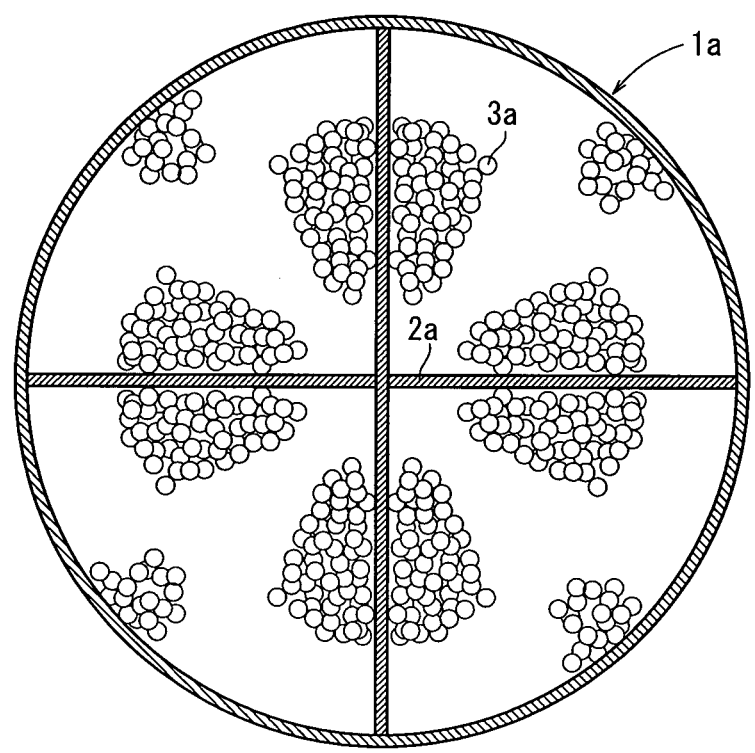
FIG. 16 is a cross-sectional view of a desulfurizer for use with a fuel cell, disclosed in Japanese Laid-Open Patent Publication No. 2008-117652.
Figure 17:
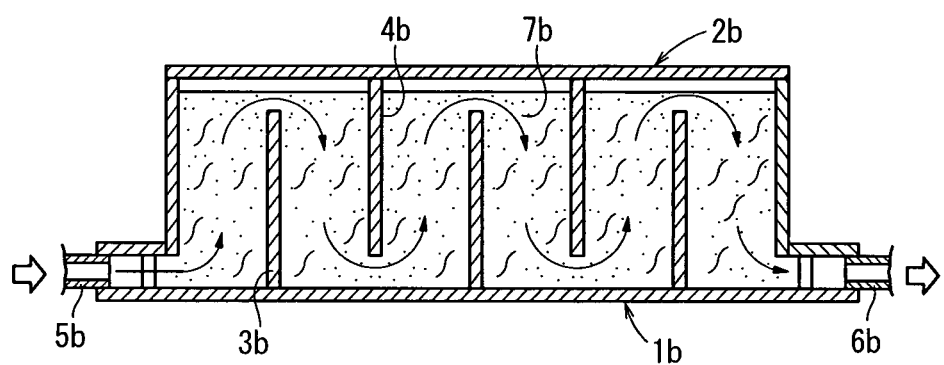
FIG. 17 is a cross-sectional view of a reformer disclosed in Japanese Laid-Open Patent Publication No. 2006-273635.

As shown in FIGS. 13 through 15, the desulfurizer 140 includes a hollow cylindrical tubular body 142. The tubular body 142 has a supply chamber 68 defined in an upper portion thereof and held in fluid communication with a supply port 62a on the upper end of the tubular body 142, and a discharge chamber 70 defined in an upper portion thereof and held in fluid communication with a discharge port 62b on the upper end of the tubular body 142. The tubular body 142 defines therein a filled chamber 66 including a raw fuel passage 144 which provides fluid communication between the supply port 62a and the discharge port 62b. The raw fuel passage 144 has a first reverser 144a, a second reverser 144b, and a third reverser 144c for reversing the direction in which the raw fuel flows.

The tubular body 142 houses a plurality of partition plates 146a through 146d extending from the center of the tubular body 142 radially outwardly to the inner circumferential surface of the tubular body 142. The first reverser 144a is formed by cutting off a lower end portion of the partition plate 146a. The second reverser 144b is formed by cutting off an upper end portion of the partition plate 146b. The third reverser 144c is formed by cutting off a lower end portion of the partition plate 146c.

The partition plates 146a, 146d are angularly spaced from each other by a maximum angle, defining therebetween a first passage region 148a having a maximum cross-sectional area. The partition plates 146a, 146b define therebetween a second passage region 148b having a medium cross-sectional area. The partition plates 146b, 146c and the partition plates 146c, 146d define therebetween respective third passage regions 148c1, 148c2 each having a minimum cross-sectional area.

According to the fifth embodiment, the desulfurizer 140 has an odd number of reversers, i.e., the first reverser 144a, the second reverser 144b, and the third reverser 144c. Therefore, the supply chamber 68 and the discharge chamber 70 are disposed in one of the axially opposite ends of the desulfurizer 140, e.g., in the upper end of the tubular body 142. Therefore, the pipe for supplying the raw fuel and the pipe for discharging the desulfurized raw fuel are placed closely together, allowing the desulfurizer 140 to be positioned flexibly.

The desulfurizer 140 according to the fifth embodiment is illustrated as having the hollow cylindrical tubular body 142 as with the desulfurizers according to the first and second embodiments. However, the desulfurizer 140 according to the fifth embodiment may have a casing similar in shape to either one of the casings of the desulfurizers according to the third and fourth embodiments.

While the invention has been particularly shown and described with reference to preferred embodiments, it will be understood that variations and modifications can be effected thereto by those skilled in the art without departing from the scope of the invention as defined by the appended claims.

The invention claimed is:

1. A desulfurizer for removing sulfur component from a raw fuel, comprising:
   a filled chamber having a raw fuel passage through which the raw fuel flows, the filled chamber being filled with a desulfurizing agent;
   a supply chamber disposed upstream of the filled chamber, for uniformly supplying the raw fuel to the raw fuel passage; and
   a discharge chamber disposed downstream of the filled chamber, for uniformly discharging the raw fuel from the raw fuel passage,
   a supply port separate and distinct from the supply chamber and disposed in fluid communication therewith,
   a discharge port separate and distinct from the discharge chamber and disposed in fluid communication therewith,
   a first mesh member disposed between the filled chamber and the supply chamber for dividing the filled chamber and the supply chamber from each other, and
   a second mesh member disposed between the filled chamber and the discharge chamber for dividing the filled chamber and the discharge chamber from each other,
   wherein the raw fuel passage has at least one reverser for reversing the direction in which the raw fuel flows; and
   the raw fuel passage has a cross-sectional area which is smaller in a downstream portion thereof than in an upstream portion thereof.

2. A desulfurizer according to claim 1, wherein the cross-sectional area of the raw fuel passage changes across at least one of the reversers.

3. A desulfurizer according to claim 1, further comprising a tubular casing
   wherein the raw fuel passage extends in an axial direction of the tubular casing; and
   the reversers are arrayed on a circle that is concentric with the center of the tubular casing.

4. A desulfurizer according to claim 1, wherein the most downstream reverser of the reversers is disposed below the discharge port.

5. A desulfurizer according to claim 1, wherein the reversers comprise an even number of reversers.

6. A desulfurizer according to claim 5, wherein the supply port is disposed below the discharge port.

7. A desulfurizer according to claim 1, wherein the reversers comprise an odd number of reversers.

8. A desulfurizer according to claim 1, wherein the cross-sectional area of the raw fuel passage is reduced continuously from upstream toward downstream of the raw fuel passage.

9. A desulfurizer according to claim 1, wherein the cross-sectional area of the raw fuel passage is reduced stepwise from upstream toward downstream of the raw fuel passage across each of the reversers.

10. A desulfurizer according to claim 9, wherein the raw fuel passage has a plurality of passage regions having respective different cross-sectional areas; and
    the passage regions have the same volume as each other.

11. A desulfurizer according to claim 1, wherein the raw fuel passage is designed such that the velocity at which the raw fuel flows through a region thereof which has a maximum cross-sectional area at a maximum flow rate is the same as the velocity at which the raw fuel flows through a region thereof which has a minimum cross-sectional area at a minimum flow rate.

\* \* \* \* \*